United States Patent [19]
Schmidt

[11] 4,000,658
[45] Jan. 4, 1977

[54] METHOD AND APPARATUS FOR MEASURING DISPLACEMENT OF FIXED STRUCTURES

[75] Inventor: Thomas R. Schmidt, Houston, Tex.
[73] Assignee: Shell Oil Company, Houston, Tex.
[22] Filed: Nov. 21, 1975
[21] Appl. No.: 634,089
[52] U.S. Cl. .................................... 73/490; 73/493
[51] Int. Cl.$^2$ ........................................ G01P 15/02
[58] Field of Search ............... 73/71.2, 71.4, 517 R, 73/517 B, 490, 503, 493

[56] References Cited

UNITED STATES PATENTS

| | | | |
|---|---|---|---|
| 2,352,219 | 6/1944 | Olesen | 73/71.2 X |
| 2,613,071 | 10/1952 | Hansel | 73/490 |
| 3,699,806 | 10/1972 | Welchbrodt | 73/71.4 |
| 3,703,681 | 11/1972 | Johnson et al. | 73/517 X |
| 3,800,599 | 4/1974 | Goran | 73/71.2 X |

OTHER PUBLICATIONS

Coyle "Measuring the Behavior of Tall Buildings" in Engineering New Letter 2/19/31 pp. 310–313.
Shea "Vibration Monitoring" in ASME Publication 2/70.
Relience Electric Bulletin No. P-2517-1 10/68.
MB Electronic Bulletin 253 12/69.

Primary Examiner—Herbert Goldstein

[57] ABSTRACT

A method and apparatus for measuring the displacement of structures using force balance accelerometers and double integration.

10 Claims, 2 Drawing Figures

METHOD AND APPARATUS FOR MEASURING DISPLACEMENT OF FIXED STRUCTURES

BACKGROUND OF THE INVENTION

The present invention relates to a method and apparatus for measuring the displacement of the free end of fixed structures such as buildings or offshore platforms used in the production of oil. The free end of structures which have a relatively small base in relation to their height are displaced either by wind forces, in the case of buildings, or wave and current action in the case of offshore platforms. It is desirable to know the actual displacement and the frequency of the displacement of these structures to provide more accurate information for designing the structures.

In the past, movement of the buildings has been determined by observing the building from a fixed position. While this method is satisfactory wherever a fixed reference is available, it obviously will not work on an offshore platform.

Inertial guidance systems are known that integrate acceleration measurements to obtain displacement measurements. This technique cannot be applied to measuring the displacement of structures having one fixed end and one free end because of the very low accelerations, velocity and displacement of these structures.

BRIEF SUMMARY OF THE INVENTION

The present invention provides a method and apparatus for accurately measuring low frequency displacements of structures which are supported from a small fixed base. The method utilizes two-force balance accelerometers having their sensitive axes disposed as substantially right angles. Preferably, the accelerometers should have a resolution in the range of $10^{-5}$ to $10^{-6}$ times the acceleration of gravity or 1 to 10 micro G's. The signal from each of the accelerometers is first filtered with a low-pass filter to remove the higher frequencies which are of no value in measuring the displacement of the average structure. For example, the low-pass filter could have an upper cutoff range of 7.5 Hz. The signals then pass through a high-pass filter which eliminates the low frequency portion of the accelerometer signal; for example, that portion below 0.03 Hz. An offshore platform or building will not move from its fixed position and thus the low frequency and apparent steady state accelerations normally associated with moving objects can be neglected. By neglecting the low frequency accelerations, a considerable amount of the noise in the form of electrical offset and drift is also removed from the signal. The filtered signals are then double integrated to provide first a velocity measurement, and then a displacement measurement. These velocity and displacement signals can, in turn, be filtered to remove the very low frequency and steady state signals if required without affecting the displacement signal. The displacement signal, as well as the acceleration signal, are both recorded on continuous chart recorders to provide a record of the actual acceleration and displacement of the structure. The data can also be recorded on magnetic tape in either an analog or digital form for later analysis. This is useful in the design of structures when the weather conditions and sea conditions are also recorded.

BRIEF DESCRIPTION OF THE DRAWING

The present invention will be more easily understood from the following detailed description of a preferred embodiment taken in conjunction with the attached drawing, in which.

PREFERRED EMBODIMENT

The present invention is adaptable to measure the displacement of any structure which is fixed with respect to the earth and has an upwardly extending free end. This type of structure can be a tall building that is subjected to wind forces or a tall offshore structure that is subjected to wind, wave and ocean current action. The invention makes use of the following assumptions (1) that the structure is fixed and is not moving with respect to the earth except for the random displacement of the free end of the structure; and (2) that the movement of the free end of the structure is, for all practical purposes, a parallelogram type of motion and rotational movement of the free end about the fixed end can be ignored. The second assumption is valid for the relatively small displacements that are to be measured with respect to the overall height of the structure, but if the displacement should become so large as to cause some motion other than parallelogram motion, then it would, of course, become necessary to mount the accelerometers on a gyroscopic table which would remain horizontal with respect to the earth.

Figure 1:
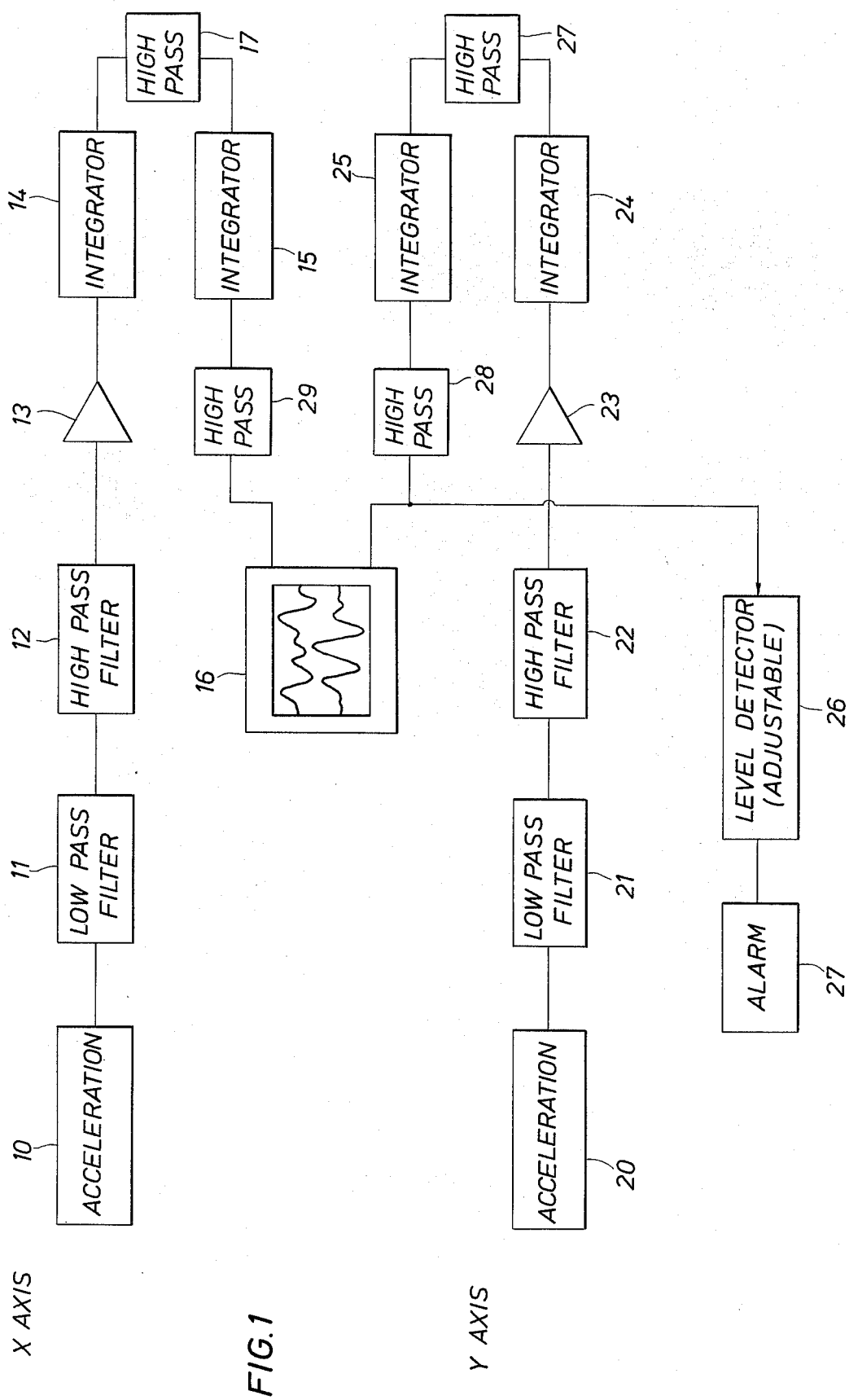
FIG. 1 is a block diagram of one embodiment of the invention.

Referring now to FIG. 1, there is shown in block diagram form an apparatus suitable for carrying out the method of the present invention. More particularly, there is shown two separate channels, one for the x-axis and one for the y-axis. Each axis includes an acceleration measuring device 10 and 20. As explained, the acceleration measuring devices are force balance accelerometers having a resolution of 0.000001G. A suitable force balance accelerometer is one manufactured by Sundstrand Corporation of Richland, Washington. The output signal from the accelerometers is passed through low-pass filters 11 and 21 and high-pass filters 12 and 22. As explained, the low-pass filters eliminate the higher frequencies; for example, all frequencies above 7.5 Hz. Normally, the upper cut-off frequency is selected so that machinery vibrations are excluded since they contain no information about platform motion and constitute a high background noise level. The high-pass filters 12 and 22 have a cut-off frequency of 0.03 Hz which eliminates those signals due to drift and offset voltages from the accelerometers and the electronic circuits. By eliminating these low frequency steady state signals, they will not introduce an error in the integrator signals.

The signals after passing through the filters are amplified by amplifiers 13 and 23 and then integrated twice by integrators 14, 15, 24 and 25. The integrating circuits preferably have time constants longer than the lowest frequency which is measured. In the case of a high-pass filter having a cut-off frequency of 0.03 Hz this time constant should be 5 seconds. In addition, the integrators should be of the type that slowly self zero themselves to prevent them from accumulating indefinitely off-set voltages or biases that may develop in the integrator electronics. High-pass filtering 7, 27, 28 and 29 can be used after each integrator if required to supplement the self zeroing feature of the integrators which also has certain high-pass characteristics. Finally, the output signal from each of the integrators is recorded on a recorder 16. While only a single recorder is shown, normally a two-channel recorder will be provided for each channel of the instrument and both the original acceleration signal and the integrated displacement signal displayed in a side-by-side relationship.

In addition, an alarm circuit can be incorporated to alert personnel of dangerous conditions. The alarm circuit may comprise an adjustable level detector 26 and audible alarm 27. The alarm level can be set at the desired maximum displacement. The alarm is desirable when offshore platforms are located in areas having extreme weather and sea conditions, for example, the Cook Inlet of Alaska and the North Sea. While only a single alarm has been shown, a similar circuit is used to detect dangerous conditions of displacement along the second axis. Also, it is possible to use a single alarm and have it respond to a dangerous displacement along either axis.

Figure 2:
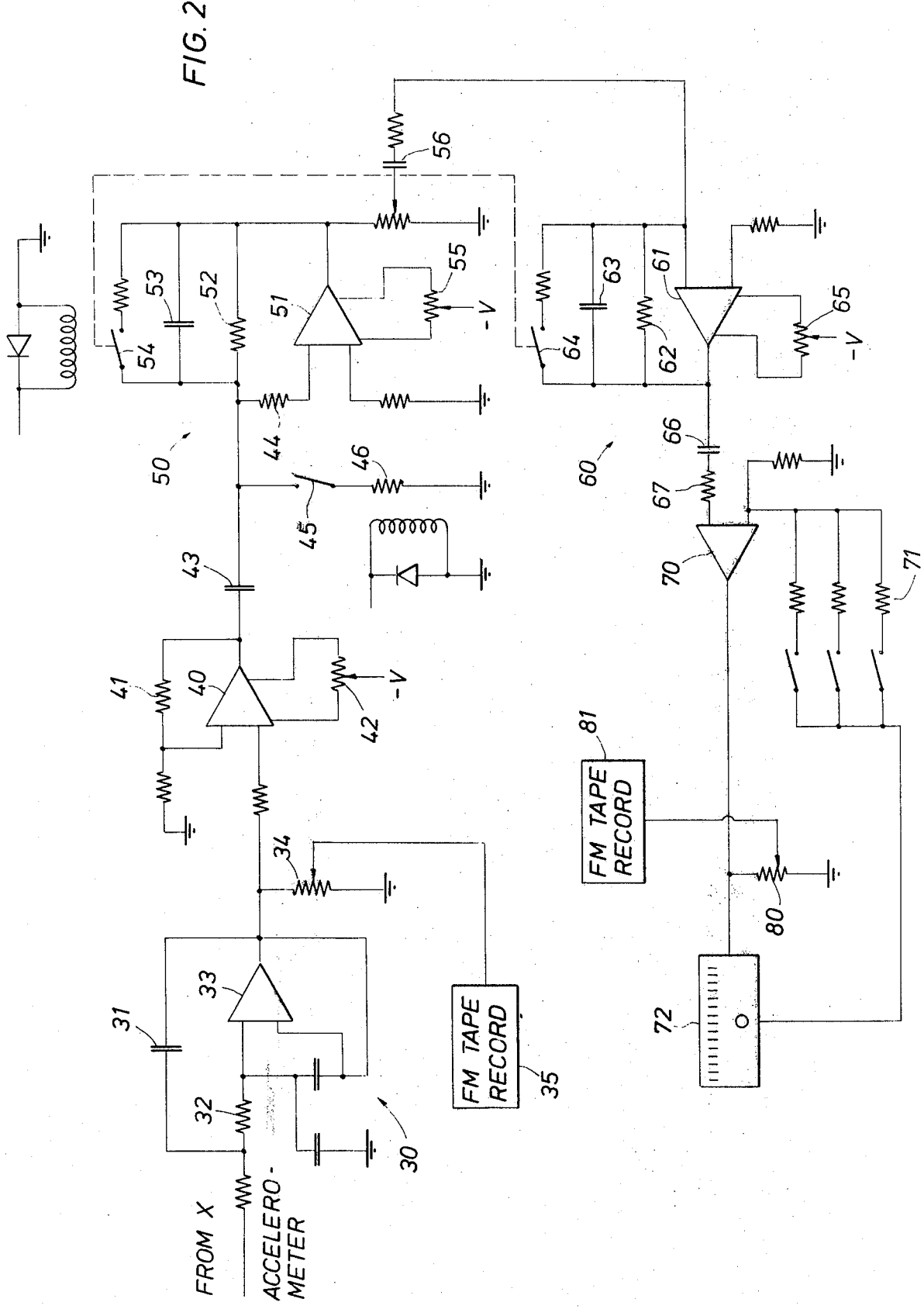
FIG. 2 is a schematic circuit diagram of one channel of filter and integration circuits.

Referring now to FIG. 2, there is shown a schematic diagram of the filter and integration circuits used in the present invention. More particularly, at 30 there is shown the low-pass filter which comprises an operational amplifier 33 having a capacitance 31 and a resistance 32 disposed in its feedback circuit. The operational amplifier is also provided with an additional capacitor between its two inputs. By the proper choice of the values of the capacitor and the resistance, the filter can be adjusted to remove those frequencies above 7.5 Hz. The output of the filter is supplied to a gain amplifier 40 which is provided with a feedback resistance 41 and a null adjustment 42. The null adjustment 42 is provided for removing the small output signal produced in the absence of any input signals as a result of the normal drift of the electronics. The output of the low-pass filter 30 is also taken off at a voltage divider 34 and recorded on an FM tape recorder 35 to provide a record of the acceleration of the structure. The amplified output is supplied to a high-pass filter which comprises the series capacitance 43 and resistance circuit 44. As explained above, this circuit is designed to remove those frequencies below 0.03 Hz which contain the drift and offset voltages from the accelerometers and electronics that are of no interest in determining the displacement of the structure. The relay switch 45 and grounding resistor 46 is provided so that the charge on the capacitor 43 may be grounded to zero the instrument when starting.

The first integrator 50 comprises an operational amplifier 51 having a parallel resistance 52 and capacitance 53 disposed in its feedback circuit. The values of the resistance and capacitance are chosen to provide the desired time constants for the integration circuit. The integrator is also provided with an adjustable resistance 55 for adjusting its output for a zero level in the absence of any input of the circuit and if desired, a high-pass filtering capacitor 56. In addition, the integrator has a relay switch 54 for grounding the feedback circuit so that the capacitor 53 may be discharged to zero the instrument as required. The output from the first integrator is taken off of a voltage divider and supplied to the input of the second integrator 60. The second integrator 60 also utilizes an operational amplifier 61 with a resistance 62 and capacitance 63 in its feedback circuit and is provided with a grounding switch 64 and a variable resistance 65 for adjusting its output. The output of the second integrator is supplied to a gain amplifier 70 having a series of range adjusting resistors 71 disposed in its feedback circuit. The output of the second integrator may be passed through a high-pass filter formed by capacitor 66 and resistance 67. One of the resistors 71 may be selected by closing the appropriate switch to adjust the gain of the amplifier to maintain the signal within the limits of display 72. Normally, the gain is adjusted to provide full scale deflections for the acceleration being measured by the system. The output of the gain amplifier 70 can also be supplied through a voltage divider circuit 80 to an FM tape recorder 81.

While but a single channel has been described above, it is obvious that the second or Y-channel is identical to that described.

While the system described is analog in nature, it is obvious that it could be implemented in digital form just as easily and might have certain advantages unique to the digital approach. Integrators, for example, become accumulating registers and are drift-free. Acceleration signals after digitizing can be processed with a variety of algorithms similar to high or low-pass filtering. Reconfiguration, time constants, etc. are easily modified in microcomputer systems.

I claim as my invention:

1. A method for measuring the displacement of the free end of a fixed structure comprising:
   positioning a pair of force balance accelerometers on said free ends to measure the acceleration of the structure along two axes at right angles;
   converting the measured acceleration along the two axes to related electrical signals;
   filtering the related electrical signals a first time to remove the frequencies above the desired frequency of the structure;
   filtering the related electrical signals a second time to remove the low frequency components produced by drift of the electronic circuits, velocity and displacement of the inertial reference device; and
   integrating each of the filtered signals twice to produce a signal related to velocity and displacement along each of the axes.

2. The method of claim 1 in which the low frequency components are below 0.03 $H_2$ and the high frequency components are above 7.5 $H_2$.

3. The method of claim 2 and in addition filtering the signals after each integration to remove low frequency components.

4. An apparatus for measuring the displacement of the free end of a fixed structure comprising:
   a pair of force balance accelerometers, said accelerometers being mounted on said structure with their axes at right angles and disposed to measure the acceleration of the free end of the structure;
   a pair of low-pass filters, each of said accelerometers being coupled to one of said low-pass filters;
   a pair of high-pass filters, each of said low-pass filters being coupled to one of said high-pass filters;
   a pair of integrating circuits, each of said integrating circuits having two separate integrators to perform a double integration, each of said high-pass filters being coupled to one of said integrating circuits; and
   a pair of display means, each of said integrating circuits being coupled to one of said display means.

5. The apparatus of claim 4 wherein said low-pass filters comprise an operational amplifier having resistance and capacitance disposed in its feedback circuit.

6. The apparatus of claim 5 wherein said low-pass filter has a cut-off frequency of 7.5 Hz.

7. The apparatus of claim 4 wherein said high-pass filter has a cut-off frequency of 0.03 Hz.

8. The apparatus of claim 4 and in addition an alarm circuit, said alarm circuit being coupled to said integrating circuits and responsive to a displacement exceeding a preset limit.

9. The apparatus of claim 8 in which said alarm circuit comprises a separate alarm for each axis of the apparatus.

10. The apparatus of claim 4 and in addition second and third pairs of high-pass filters, one high-pass filter of said second pair being disposed between the separate integrators of each of said integrating circuits and one high-pass filter of said third pair of high-pass filters being disposed between each of the integrating circuits and said display means.

* * * * *